(12) United States Patent
Cannan et al.

(10) Patent No.: US 7,036,591 B2
(45) Date of Patent: May 2, 2006

(54) LOW DENSITY PROPPANT

(75) Inventors: Chad D. Cannan, Georgetown, TX (US); Thomas C. Palamara, Eufaula, AL (US)

(73) Assignee: CARBO Ceramics Inc., Irving, TX (US)

( * ) Notice: Subject to any disclaimer, the term of this patent is extended or adjusted under 35 U.S.C. 154(b) by 0 days.

(21) Appl. No.: 10/268,169

(22) Filed: Oct. 10, 2002

(65) Prior Publication Data

US 2004/0069490 A1 Apr. 15, 2004

(51) Int. Cl.
*E21B 43/267* (2006.01)

(52) U.S. Cl. ..................................... 166/280.2; 507/924
(58) Field of Classification Search ............... 166/280.1, 166/280.2; 507/924
See application file for complete search history.

(56) References Cited

U.S. PATENT DOCUMENTS

| | | |
|---|---|---|
| 1,942,431 A | 1/1934 | Jung |
| 2,699,212 A | 1/1955 | Dismukes |
| 2,950,247 A | 8/1960 | McGuire, Jr. et al. |
| 3,026,938 A | 3/1962 | Huitt et al. |
| 3,075,581 A | 1/1963 | Kern |
| 3,079,243 A | 2/1963 | Ueltz |
| 3,126,056 A | 3/1964 | Harrell |
| 3,241,613 A | 3/1966 | Kem et al. |
| 3,242,032 A | 3/1966 | Schott |
| 3,245,866 A | 4/1966 | Schott |

(Continued)

FOREIGN PATENT DOCUMENTS

| | | |
|---|---|---|
| AR | 241543 | 8/1992 |
| AR | 243222 | 7/1993 |
| AU | 551409 | 1/1983 |
| CA | 1045027 | 12/1978 |
| CA | 1117987 | 2/1982 |
| CA | 1172837 | 8/1984 |
| CA | 1191020 | 7/1985 |
| CA | 1194685 | 10/1985 |
| CA | 1232751 | 2/1988 |
| CA | 2444826 | 4/2004 |

(Continued)

OTHER PUBLICATIONS

Rickards, A.R. et al., "High Strength, Ultra Lightweight Proppant Development Lends New Dimensions to Hydraulic Fracturing Applications", SPE 84308, Oct. 7, 2003.

Letter dated Aug. 4, 1978 to B. Poplin from D. Golden, Coors Porcelain Company, with "Proposal to Supply Proppant," presented to Halliburton Services, issued Aug. 09, 1978.

Light Weight Proppants for Deep Gas Well Stimulation, $2^{nd}$ Annual Report, Jul. 01, 1980–Jun. 30, 1981, published Apr. 1982, DOE Contract AC 19–79BC10038, by R.A. Cutler et al, Terra Tek, Inc.

(Continued)

*Primary Examiner*—Kenneth Thompson
(74) *Attorney, Agent, or Firm*—Priscilla L. Ferguson; Randall C. Brown; Haynes and Boone, LLP

(57) ABSTRACT

A low density, spherical proppant made from kaolin clay having an alumina content distributed homogeneously throughout the pellets, an apparent specific gravity of from about 1.60 to about 2.10 g/cc, and a bulk density of from about 0.95 to about 1.30 g/cc. The low density is achieved by controlling the time and temperature of the firing process to be from about 1200 to about 1350° C. This low density proppant is useful in hydraulic fracturing of shallow oil and gas wells.

20 Claims, 1 Drawing Sheet

U.S. PATENT DOCUMENTS

| | | | |
|---|---|---|---|
| 3,347,798 A | 10/1967 | Baer et al. | |
| 3,350,482 A | 10/1967 | Bowers | |
| 3,437,148 A | 4/1969 | Colpoys, Jr. | |
| 3,486,706 A | 12/1969 | Weyand | |
| 3,491,492 A | 1/1970 | Ueltz | |
| 3,497,008 A | 2/1970 | Graham et al. | |
| 3,598,373 A | 8/1971 | Inman | |
| 3,690,622 A | 9/1972 | Brunner et al. | |
| 3,758,318 A | 9/1973 | Farris et al. | |
| 3,810,768 A | 5/1974 | Parsons et al. | |
| 3,856,441 A | 12/1974 | Suzukawa et al. | |
| 3,890,072 A | 6/1975 | Barks | |
| 3,976,138 A | 8/1976 | Colpoys, Jr. et al. | |
| 4,051,603 A | 10/1977 | Kern, Jr. | |
| 4,052,794 A | 10/1977 | Ganiaris | |
| 4,053,375 A | 10/1977 | Roberts et al. | |
| 4,068,718 A | 1/1978 | Cooke, Jr. et al. | |
| 4,072,193 A | 2/1978 | Sarda et al. | |
| 4,104,342 A | 8/1978 | Wessel et al. | |
| 4,140,773 A | 2/1979 | Stowell et al. | |
| 4,268,311 A | 5/1981 | VerDow | |
| 4,296,051 A | 10/1981 | Shimamura et al. | |
| 4,303,204 A | 12/1981 | Weston | |
| 4,343,751 A | 8/1982 | Kumar | |
| 4,371,481 A | 2/1983 | Pollock | |
| 4,427,068 A | 1/1984 | Fitzgibbon | |
| 4,440,866 A | 4/1984 | Lunghofer et al. | |
| 4,442,897 A | 4/1984 | Crowell | |
| 4,462,466 A | 7/1984 | Kachnik | |
| 4,493,875 A * | 1/1985 | Beck et al. | 428/403 |
| 4,522,731 A | 6/1985 | Lunghofer | |
| 4,547,468 A | 10/1985 | Jones et al. | |
| 4,555,493 A | 11/1985 | Watson et al. | |
| 4,623,630 A | 11/1986 | Fitzgibbon | |
| 4,632,876 A * | 12/1986 | Laird et al. | 428/404 |
| 4,639,427 A | 1/1987 | Khaund | |
| 4,654,266 A * | 3/1987 | Kachnik | 428/403 |
| 4,658,899 A | 4/1987 | Fitzgibbon | |
| 4,668,645 A | 5/1987 | Khaund | |
| 4,680,230 A | 7/1987 | Gibb et al. | |
| 4,713,203 A | 12/1987 | Andrews | |
| 4,744,831 A | 5/1988 | Beck | |
| 4,879,181 A | 11/1989 | Fitzgibbon | |
| 4,894,285 A | 1/1990 | Fitzgibbob | |
| 4,921,820 A | 5/1990 | Rumpf et al. | |
| 4,921,821 A | 5/1990 | Rumpf et al. | |
| 5,030,603 A | 7/1991 | Rumpf et al. | |
| 5,120,455 A | 6/1992 | Lunghofer | |
| 5,175,133 A | 12/1992 | Smith et al. | |
| 5,188,175 A | 2/1993 | Sweet | |
| 5,964,291 A | 10/1999 | Bourne et al. | |
| 6,059,034 A * | 5/2000 | Rickards et al. | 166/280.2 |
| 6,330,916 B1 | 12/2001 | Rickards et al. | |
| 6,364,018 B1 * | 4/2002 | Brannon et al. | 166/280.2 |
| 6,372,678 B1 * | 4/2002 | Youngman et al. | 501/128 |
| 6,725,930 B1 | 4/2004 | Boney et al. | |
| 6,749,025 B1 | 6/2004 | Brannon et al. | |
| 6,753,299 B1 | 6/2004 | Lunghofer et al. | |
| 6,772,838 B1 | 8/2004 | Dawson et al. | |
| 6,780,804 B1 | 8/2004 | Webber et al. | |
| 2004/0040708 A1 | 3/2004 | Stephenson et al. | |
| 2004/0200617 A1 | 10/2004 | Stephenson et al. | |
| 2005/0028979 A1 | 2/2005 | Brannon et al. | |

FOREIGN PATENT DOCUMENTS

| | | |
|---|---|---|
| CH | 647689 | 2/1985 |
| DE | 2921336 | 12/1979 |
| DE | 2948584 | 6/1980 |
| DK | 137042 | 1/1978 |
| DK | 168099 | 7/1983 |
| EP | 0083974 | 7/1983 |
| EP | 0087852 | 9/1983 |
| EP | 0101855 | 3/1984 |
| EP | 0116369 | 8/1984 |
| EP | 0169412 | 1/1986 |
| FR | 1483696 | 6/1967 |
| FR | 2486930 | 1/1982 |
| GB | 578424 | 7/1946 |
| GB | 715354 | 9/1954 |
| GB | 886342 | 1/1962 |
| GB | 992237 | 5/1965 |
| GB | 1033143 | 6/1966 |
| GB | 1411135 | 10/1975 |
| GB | 1421531 | 1/1976 |
| GB | 2037727 | 7/1980 |
| GB | 2079261 | 1/1982 |
| GB | 2092561 | 10/1983 |
| JP | 88105 | 7/1975 |
| MX | 161299 | 9/1990 |
| PE | 003273 | 11/1983 |
| PH | 18450 | 7/1985 |
| RU | 98118148/12 | 10/1998 |
| RU | 98118361/12 | 10/1998 |
| RU | 2129987 | 5/1999 |
| RU | 2140874 | 11/1999 |
| RU | 2140875 | 11/1999 |
| RU | 99107936 | 1/2001 |
| RU | 2166079 | 4/2001 |
| RU | 2196889 | 1/2003 |
| RU | 2206930 | 6/2003 |
| RU | 2211198 | 8/2003 |
| RU | 2212719 | 9/2003 |
| RU | 2215712 | 11/2003 |
| RU | 2003100030/03 | 11/2003 |
| RU | 2002117351 | 1/2004 |
| SU | 628136 | 9/1978 |
| VE | 48083 | 7/1990 |
| VE | 49128 | 2/1993 |

OTHER PUBLICATIONS

Light Weight Proppants for Deep Gas Well Stimulation, A. H. Jones et al, Terra Tek, Inc., Jun. 1980, TR Report 80–47.

Oxide Ceramic Proppants for Treatment of Deep Well Fractures, SPE 6816, by E.A. Neel, J.L.Panmley, and P.J. Colpoys, Jr. (1977).

UCAR Ceramic Props, The Ideal Proppant for Deep Wells and High Compaction Pressures.

DOE Progress Review No. 26 for reporting period Jan. 1–Mar. 31, 1981, Determine Feasibility of Fabricated Light Weight Proppants for Application in Gas and Oil Well Stimulation.

Unimin Brochure, Unimin Canada Ltd., Mar. 1991.

Role of Impurities on Formation of Mullite from Kaolinite and $Al_2O_3$—$S_iO_2$ Mixtures, Johnson, Sylvia M. et al., Ceramic Bulletin, vol. 61, No. 8 (1982), pp. 838–842.

Determining Feasibility of Fabricating Light Weight Proppants for Application in Gas and Oil Well Stimulation, Progress Report 2, DOE Contract DE–AC19–79BC10038, Submitted by Terra Tek, Inc., TR 79–77, Oct. 1979.

Determining Feasibility of Fabricating Light Weight Proppants for Application in Gas and Oil Well Stimulation, Progress Report 10, DOE Contract DE–AC19–79BC10038, Submitted by Terra Tek, Inc., TR 80–77, Jul. 1980.

New Proppants for Deep Gas Well Stimulation, SPE 9869, by Raymond A. Cutler, et al., 1977.

Effect of Grinding and Firing Treatment on the Crystalline and Glass Content and the Physical Properties of Whiteware Bodies; S. C. Sane, et al., 1951.

Nepheline Syenite–Talc Mixtures as a Flux in Low–Temperature Vitrified Bodies; E. D. Lynch, et al., Apr. 1950.

Engineering Properties of Ceramics, Databook to Guide Materials Selection for Structural Applications, J. F. Lynch, et al., TR 66–52, Jun. 1966.

Reactions in Silica–Alumina Mixtures, Richard R. West, et al., Apr. 1958.

Synthesis and Mechanical Properties of Stoichiometric Aluminum Silicate (Mullite), K. S. Mazdiyasni, et al., Dec. 1972.

Hydraulic Fracturing with a High–Strength Proppant, Claude E. Cooke, Society of Petroleum Engineers of AIME, SPE 6213, 1976.

The Effect of Various Proppants and Proppant Mixtures on Fracture Permeability, Robert R. McDaniel, et al., SPE 7573, 1978.

The Industrial Uses of Bauxite, N.V.S. Knibbs, D.Sc., 1928.

Bauxite, Cyril S. Fox, 1927.

Pages from The National Atlas of the United States of America.

DOE Progress Review No. 21 for reporting period Oct. 1–Dec. 31, 1979, Determining Feasibility of Fabricating Light Weight Proppants for Application in Gas and Oil Well Stimulation.

DOE Progress Review No. 22 for reporting period Jan. 1–Mar. 31, 1980, Determining Feasibility of Fabricating Light Weight Proppants for Application in Gas and Oil Well Stimulation.

DOE Progress Review No. 23 for reporting period Apr. 1–Jun. 30, 1980, Determining Feasibility of Fabricating Light Weight Proppants for Application in Gas and Oil Well Stimulation.

DOE Progress Review No. 24 for reporting period Jul. 1–Sep. 31, 1980, Detemining Feasibility of Fabricating Light Weight Proppants for Application in Gas and Oil Well Stimulation.

DOE Progress Review No. 27 for reporting period Apr. 1–Jun. 30, 1981, Determining Feasibility of Fabricating Light Weight Proppants for Application in Gas and Oil Well Stimulation.

Document entitled "February, March, April 1998: Commercial Activity", with Exhibits A–D.

Document entitled "July 1998: Commerical Activity", with Exhibit E.

Document entitled "September 2001: Commerical Activity", with Exhibit F.

ScalePROP brochure, Schlumberger, Jan. 2002.

* cited by examiner

LOW DENSITY PROPPANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

This invention is in the field of propping agents or proppants used to hold open the fractures in subterranean formations around oil and gas wells created during hydraulic fracturing operations. More particularly it relates to a low density proppant, a method of making the low density proppant and a method of using the low density propping agent in shallow formation fracturing operations.

2. Description of the Related Art

Hydraulic fracturing is a technique intended to increase the productivity of an oil or gas well by creating conductive fractures or channels in the formation surrounding the well. First, a fluid is injected into the well at a sufficiently high rate to hydraulically fracture the underground formation thus creating and propagating a crack or fracture in the rock.

Next, a propping agent is added to the fluid and is pumped into the formation to "prop" open the newly formed cracks once the fracturing operation ceases. These cracks that are propped open facilitate the flow of oil or gas from the formation into the wellbore for recovery. Without the addition of the propping agent, the cracks would close under the lateral or overburden closure stress. The propping agent is pumped into the fractured formation in a slurry of fluid and propping agent. This propping agent must have sufficient strength to resist crushing by the closure stresses of the formation. The deeper the well depth, generally the stronger the proppant needs to be to resist crushing. Thus, the proppants used in shallower depths need not be quite as strong as the proppants used in deeper depths.

It has long been known that sintered bauxite having an alumina content of about 85% is strong enough to withstand crushing at well depths of greater than 20,000 feet. However, these high strength propping agents have high densities, i.e. apparent specific gravities above 3.4 g/cc, and require high viscosity pumping fluids or high pumping rates to keep them in suspension during the pumping operation. High strength proppants require larger pumping equipment and cause greater than normal wear on fluid carrying equipment. Because of the disadvantages associated with high density proppants, the proppant industry has created a variety of proppants with lower densities and less strength for use in shallower wells.

Intermediate density proppants, e.g., apparent specific gravity from about 3.1 to 3.4 g/cc, have been found to have sufficient strength to provide adequate permeability at intermediate depths and pressures. In these intermediate density proppants, the density was lowered primarily by lowering the alumina content to about 75%, as described in U.S. Pat. No. 4,427,068, which issued to Fitzgibbon. The intermediate density proppants are recommended for use in well depths of from about 8,000 to about 12,000 feet.

A low density proppant is described in U.S. Pat. No. 5,120,455, which issued to Lunghofer, using kaolin clay having a 50% alumina content. This low density proppant has an apparent specific gravity of less than 3.0 g/cc (actually 2.62 to 2.65 g/cc) and is used for well depths up to about 8,000 feet.

An even lower density proppant, having an apparent specific gravity of from 2.20 to 2.60 g/cc, is described in U.S. Pat. No. 5,188,175, which issued to Sweet, using a starting material having an alumina content of from 25% to 40%. As noted in U.S. Pat. No. 5,188,175, the reduced density means that the pumping fluid can be less viscous and the pumping rate can be lowered, both of which are cost saving features. Therefore, there is a desire in the industry for a proppant that has an even lower density that the Sweet proppant, i.e., apparent specific gravity of 2.10 g/cc or less.

As can be seen from the prior art, lowering the alumina content of the material generally results in a lower density proppant. However, there is a real problem with the strength of the proppant when the alumina content gets too low because the corresponding higher silica content causes significant loss of strength. Therefore, efforts to get an even lighter proppant by using lower alumina material have failed. Nevertheless, the industry still wants a very low density proppant, i.e., apparent specific gravity 2.10 g/cc or less, that is strong enough to be used in shallow wells, i.e., wells less than about 5000 feet.

SUMMARY OF THE INVENTION

This invention is a proppant for use in shallow oil and gas wells which has an apparent specific gravity of from about 1.60 to about 2.10 g/cc, a bulk density of from about 0.95 to about 1.30 g/cc. Preferably, the alumina content is between about 40 and 60%. Most preferably, the proppant has an alumina content of about 50%. In order to achieve an apparent specific gravity of from about 1.60 to about 2.10 g/cc and a bulk density of from about 0.95 to about 1.30 g/cc, the pellets are fired at a temperature of from about 1200 to about 1350° C. Generally, the firing time is less than about 30 minutes.

DETAILED DESCRIPTION OF INVENTION

Figure 1:
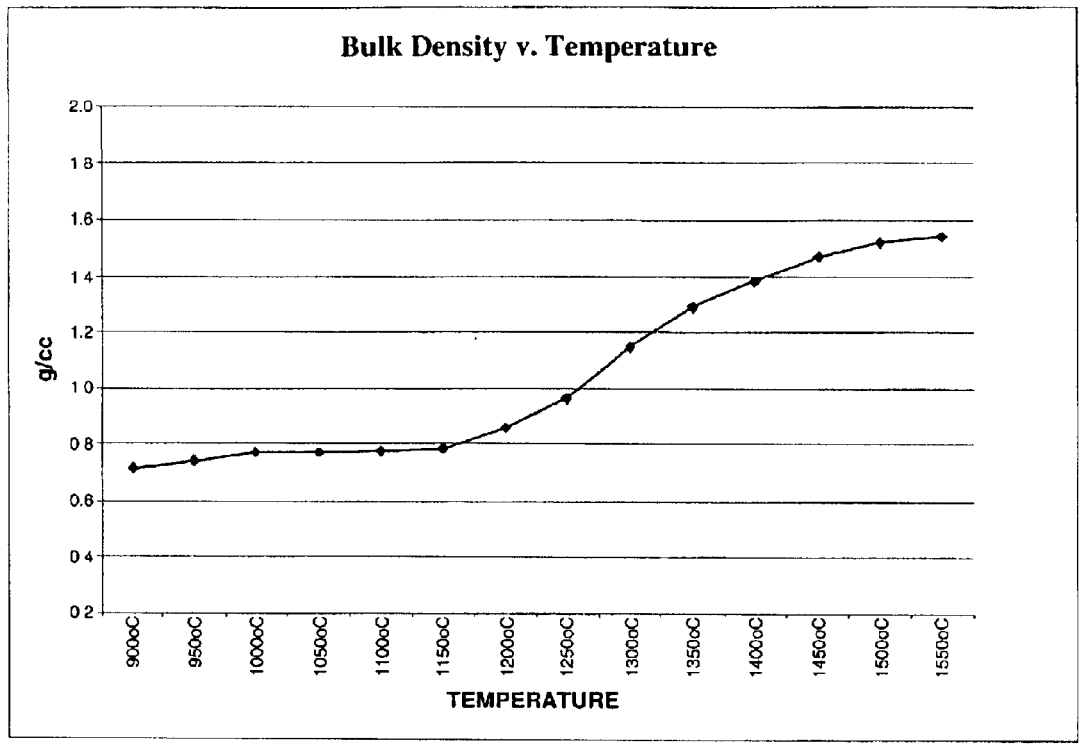
FIG. 1 is a plot of bulk density versus temperature for samples of the proppant of the present invention.

The proppant of the present invention is in the form of solid spherical pellets made from naturally occurring materials, such as kaolin clay. This invention is a proppant for use in shallow oil and gas wells which has an apparent specific gravity of from about 1.60 to about 2.10 g/cc and a bulk density of from about 0.95 to about 1.30 g/cc. Preferably, the alumina content is between about 40 and 60%. Most preferably, the proppant has an alumina content of about 50%.

One advantage of this lower density proppant is that fewer pounds of this proppant are required, as compared to higher density proppants, to fill a given void in the formation. Since proppants are generally sold by the pound, the user buys fewer pounds of proppant for a particular application. Another advantage of this low density proppant is the ability to use a lower viscosity fluid during pumping operations, resulting in more economical pumping at lower pumping rates than those required with the use of heavier or denser proppants. Still another advantage is the relatively low silica content.

These advantages can be achieved by forming solid spherical pellets or particles from kaolin clay having an alumina content of between 40 and 60%. Normally, this material would have an apparent specific gravity of about 3.0 g/cc, as disclosed in Lunghofer. However, the density can be significantly reduced by carefully controlling the time and temperature of the firing process. In order to achieve an apparent specific gravity of from about 1.60 to about 2.10 g/cc and a bulk density of from about 0.95 to about 1.30 g/cc, the pellets are fired at a temperature of from about 1200 to about 1350° C.

Generally, the firing time is less than about 30 minutes. However, there is an inverse relationship between the time and temperature which means that a higher firing temperature generally dictates a shorter firing time. Ideally, the goal is to put the minimum amount of energy into the pellets to sinter and obtain crystallization without fully densifying the material. Another way to express the time-temperature relationship is to quantify the amount of energy that goes into each pound of material. For example, the preferred pellet, which has an apparent specific gravity of about 1.8 g/cc and a bulk density of about 1.10 g/cc, requires about 1340 Btu's per pound during the firing step.

The term "spherical" is used in this invention to refer to both roundness and sphericity and will designate pellets having an average ratio of minimum diameter to maximum diameter of about 0.7 or greater on the Krumbein and Sloss chart as determined by visually grading 10 to 20 randomly selected particles.

The term "apparent specific gravity" as used herein is the weight per unit volume (grams per cubic centimeter) of the particles, including the internal porosity. The apparent specific gravity for a variety of commercially available proppants is given in Table 1.

The term "bulk density" as used herein is the weight per unit volume (grams per cubic centimeter) including the void spaces between the particles in the volume considered. The bulk density for a variety of commercially available proppants is given in Table 1.

The term "calcined" refers to a drying process by which ore materials which have been subjected to a calcining process and which exhibit very low Loss on Ignition (LOI) and moisture contents, e.g. about 1–2 percent by weight or less. Uncalcined ore material such as bauxites and clays can contain from about 10 to about 40 percent by weight volatiles. Volatiles can include moisture, organics and chemically held water (e.g. water of hydration).

For purposes of this disclosure, methods of testing a proppant's apparent specific gravity, bulk density, and crush strength are the standard API tests that are routinely performed on proppant samples, with one exception. Normally, water is the medium used to measure the apparent specific gravity of a proppant because water does not penetrate the surface pores and internal voids. However, with a porous proppant, water can penetrate the surface pores and give an inaccurate measure of the apparent specific gravity, as defined herein. Therefore, mercury is the preferred medium to measure the apparent specific gravity for proppants because it will not penetrate even porous proppants, giving a more accurate measure for comparison purposes. One independent laboratory commonly used by manufacturers, service companies, and production companies to verify the properties of a proppant is Stim Lab.

TABLE 1

Bulk Density and Apparent Specific Gravity of Various Commercial Proppants

| Proppant | Bulk Density g/cc | Apparent Specific Gravity g/cc |
|---|---|---|
| 20/40 Jordan Sand | 1.60 | 2.62 |
| 20/40 Resin Coated Sand | 1.60 | 2.61 |
| Light Weight Ceramic | 1.56 | 2.70 |
| Intermediate Strength Ceramic | 1.88 | 3.27 |
| High Strength Ceramic | 2.00 | 3.56 |

Another important characteristic of any proppant is its conductivity to fluids at various closure stresses. A conductivity test is routinely run on proppants to determine the decrease of fluid flow rate through the proppant sample as the pressure (or closure stress) on the proppant pack is increased. In the conductivity test, a measured amount of proppant, e.g. two pounds per sq. ft., is placed in a cell and a fluid (usually deionized water) is passed through the proppant pack at various flow rates. As pressure on the pack is increased, it causes the proppant to crush, thereby decreasing the flow capacity that is being measured. The conductivity of a proppant is one of the best indicators of its crush strength, and it provides valuable information about how the proppant will perform in the subterranean formation. Generally, the conductivity data is expressed as a curve showing decrease in conductivity with increase in closure pressure. The proppant of this invention has a low density which allows for good proppant transport while the strength and sphericity results in good retained conductivity.

In the preferred method for pellet formation, the starting material, preferably kaolin clay, is ground to a mean particle size of from about 2.0 to about 4.5 microns to form a dry powder. The ground material, either calcined or uncalcined, is mixed with small amounts of binder and water in a high intensity mixer. This dry pelletizing process is well known in the proppant manufacturing industry and is described in detail in Fitzgibbon U.S. Pat. No. 4,427,068. A preferred mixing device is that obtainable from Eirich Machines, Inc., known as an Eirich Mixer. A mixer of this type is provided with a horizontal or inclined circular table, which can be made to rotate at a speed of from about 10 to 60 revolutions per minute (rpm), and is provided with a rotatable impacting impeller, which can be made to rotate at a tip speed of from about 5 to about 50 meters per second. The direction of rotation of the table is opposite that of the impeller, causing material added to the mixer to flow over itself in a countercurrent manner. The central axis of the impacting impeller is generally located within the mixer at a position off center from the central axis of the rotatable table. The table may be in a horizontal or inclined position, wherein the incline, if any, is between 0 and 35 degrees from the horizontal.

The dry powder is continually added until the desired size of green pellets is reached. The preferred binder of this invention is PVA, but any binder that adequately holds the unfired pellet together and does not adversely affect the strength of the fired pellet will suffice. The green pellets are then sintered at a temperature from about 1200 to about 1350° C. in a rotary kiln. Preferably, the residence time is less than about 30 minutes. This process results in a spherical pellet with an apparent specific gravity of from about 1.60 to about 2.10 g/cc and a bulk density of from about 0.95 to about 1.30 g/cc depending generally on the firing temperature. Another way to express the time-temperature relationship is to quantify the amount of energy that goes into each pound of material. For example, the preferred pellet, which has an alumina content of about 50%, an apparent specific gravity of about 1.8 g/cc and a bulk density of about 1.10 g/cc, requires about 1340 Btu's per pound during the firing step.

An alternative method of forming the pellets is disclosed in U.S. Pat. No. 4,440,866, which issued to Lunghofer. This wet pelletizing process is also well known in the proppant manufacturing industry and need not be detailed in this disclosure. The firing time and temperature would not be affected by the pellet formation process, and the quality of the final product should not be affected by the pellet formation process.

Figure 2:
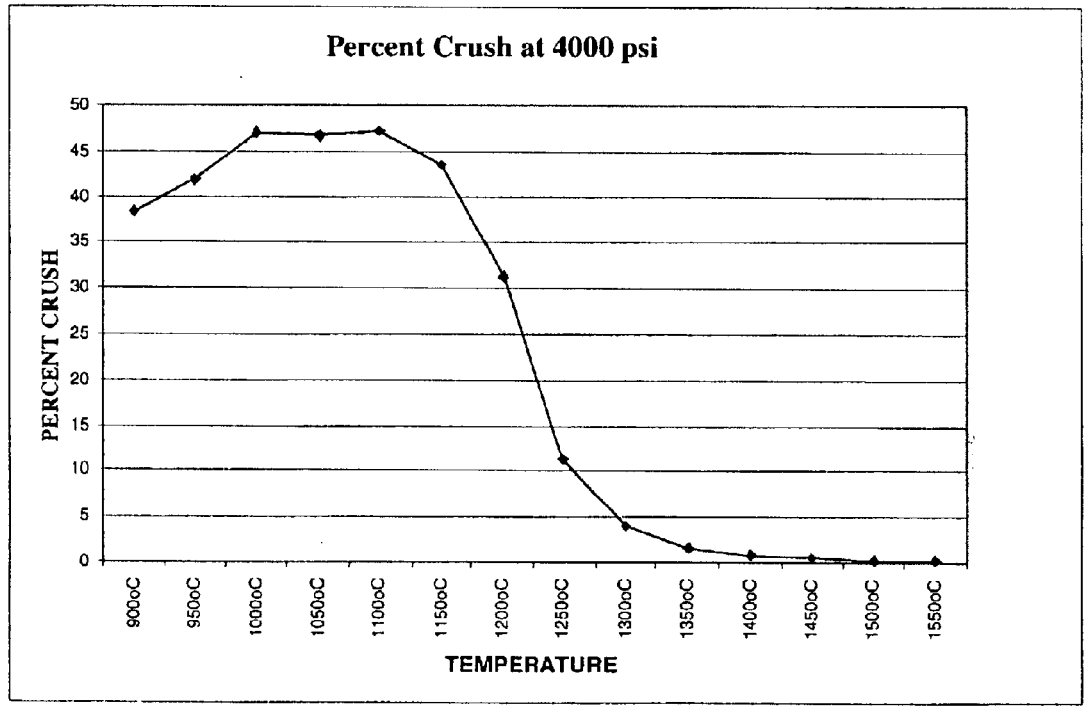
FIG. 2 is a plot of percent crush at 4000 psi versus temperature for samples of the proppant of the present invention.

It can be seen from FIG. 1 that pellets which are fired at lower temperatures have a lower bulk density (and lower apparent specific gravity) than those fired at higher temperatures. Conversely, FIG. 2 shows that pellets fired at lower temperatures have a higher 4000 psi percent crush than those fired at higher temperatures. Thus, the preferred firing temperature range of from about 1200 to about 1350° C. is ideal for making a pellet that exhibits a very low apparent specific gravity and bulk density but maintains a percent crush at 4000 psi of less than about 30%, preferably less than about 10%. Furthermore, the pellets of this invention exhibited a crush of less than about 25% at 7000 psi as shown in the following table:

TABLE 2

| Firing Temperature | Percent Crush at 7000 psi |
|---|---|
| 1265° C. | 21.7 |
| 1283° C. | 16.7 |
| 1290° C. | 20.8 |

Use of this invention is especially suited for hydraulically fracturing shallow gas wells and coalbed methane wells where $CO_2$ is used as a fracturing fluid. Such wells are generally less than about 5,000 feet in depth.

It will be obvious to those skilled in the art that the invention described here can be essentially duplicated by making minor changes in the material content or the method of manufacture. To the extent that such material or methods are substantially equivalent, it is intended that they be encompassed by the following claims.

What we claim is:

1. A method of fracturing a subterranean formation which comprises
    injecting a hydraulic fluid into the formation at a rate and pressure sufficient to open a fracture therein,
    injecting into the fracture a fluid containing sintered, spherical pellets having an alumina content distributed homogeneously throughout the pellets, an apparent specific gravity of from about 1.60 to about 2.10 g/cc, and a bulk density of from about 0.95 to about 1.30 g/cc.

2. The method of claim 1, wherein the pellets have less than about 30% crush at 4000 psi.

3. The method of claim 2, wherein the pellets have less than about 10% crush at 4000 psi.

4. The method of claim 1, wherein the pellets have less than about 25% crush at 7000 psi.

5. A sintered spherical pellet comprising an alumina content distributed homogeneously throughout the pellet, an apparent specific gravity of from about 1.60 to about 2.10 g/cc, and a bulk density of from about 0.95 to about 1.30 g/cc.

6. The pellet of claim 5, further comprising a crush of less than about 30% at 4000 psi.

7. The pellet of claim 6, further comprising a crush of less than about 10% at 4000 psi.

8. The pellet of claim 5, further comprising a crush of less than about 25% at 7000 psi.

9. A method of making sintered, spherical pellets having an alumina content distributed homogeneously throughout the pellets and an apparent specific gravity of from about 1.60 to about 2.10 g/cc and a bulk density of from about 0.95 to about 1.30 g/cc comprising the steps of:
    (a) pelletizing a naturally occurring ore; and,
    (b) sintering the pellets at temperatures of from about 1200 to about 1350°C.

10. The method of claim 9, wherein the naturally occurring ore is kaolin clay.

11. A method of fracturing a subterranean formation comprising
    injecting a hydraulic fluid into the formation at a rate and pressure sufficient to open a fracture therein,
    injecting into the fracture a fluid containing sintered, spherical pellets, at least one of which pellets has an alumina content in an amount of from about 40 to about 60 percent distributed homogeneously throughout the pellet, an apparent specific gravity of from about 1.60 to about 2.10 g/cc, a bulk density of from about 0.95 to about 1.30 g/cc, and less than about 30% crush at 4000 psi.

12. The method of claim 11, wherein the at least one pellet has less than about 10% crush at 4000 psi.

13. The method of claim 11, wherein the at least one pellet has less than about 25% crush at 7000 psi.

14. A sintered, spherical pellet having an alumina content of from about 40 to about 60 percent distributed homogeneously throughout, an apparent specific gravity of from about 1.60 to about 2.10 g/cc, a bulk density of from about 0.95 to about 1.30 g/cc, and less than about 30% crush at 4000 psi.

15. The pellet of claim 14, which pellet has less than about 10% crush at 4000 psi.

16. The pellet of claim 14, which pellet has less than about 25% crush at 7000 psi.

17. A method of making sintered, spherical pellets having an alumina content of from about 40 to about 60 percent distributed homogeneously throughout the pellets, an apparent specific gravity of from about 1.60 to about 2.10 g/cc, a bulk density of from about 0.95 to about 1.30 g/cc, and less than about 30% crush at 4000 psi, comprising the steps of:
    (a) pelletizing a naturally occurring ore; and,
    (b) sintering the pellets at temperatures of from about 1200 to about 1350°C.

18. The method of claim 17, wherein the naturally occurring ore is kaolin clay.

19. The method of claim 17, wherein at least one of the pellets has less than about 10% crush at 4000 psi.

20. The method of claim 17, wherein at least one of the pellets has less than about 25% crush at 7000 psi.

* * * * *